March 15, 1966   L. D. RICHARDS   3,240,360
WORK PIECE TRANSFER DEVICE
Filed March 2, 1964   4 Sheets-Sheet 1
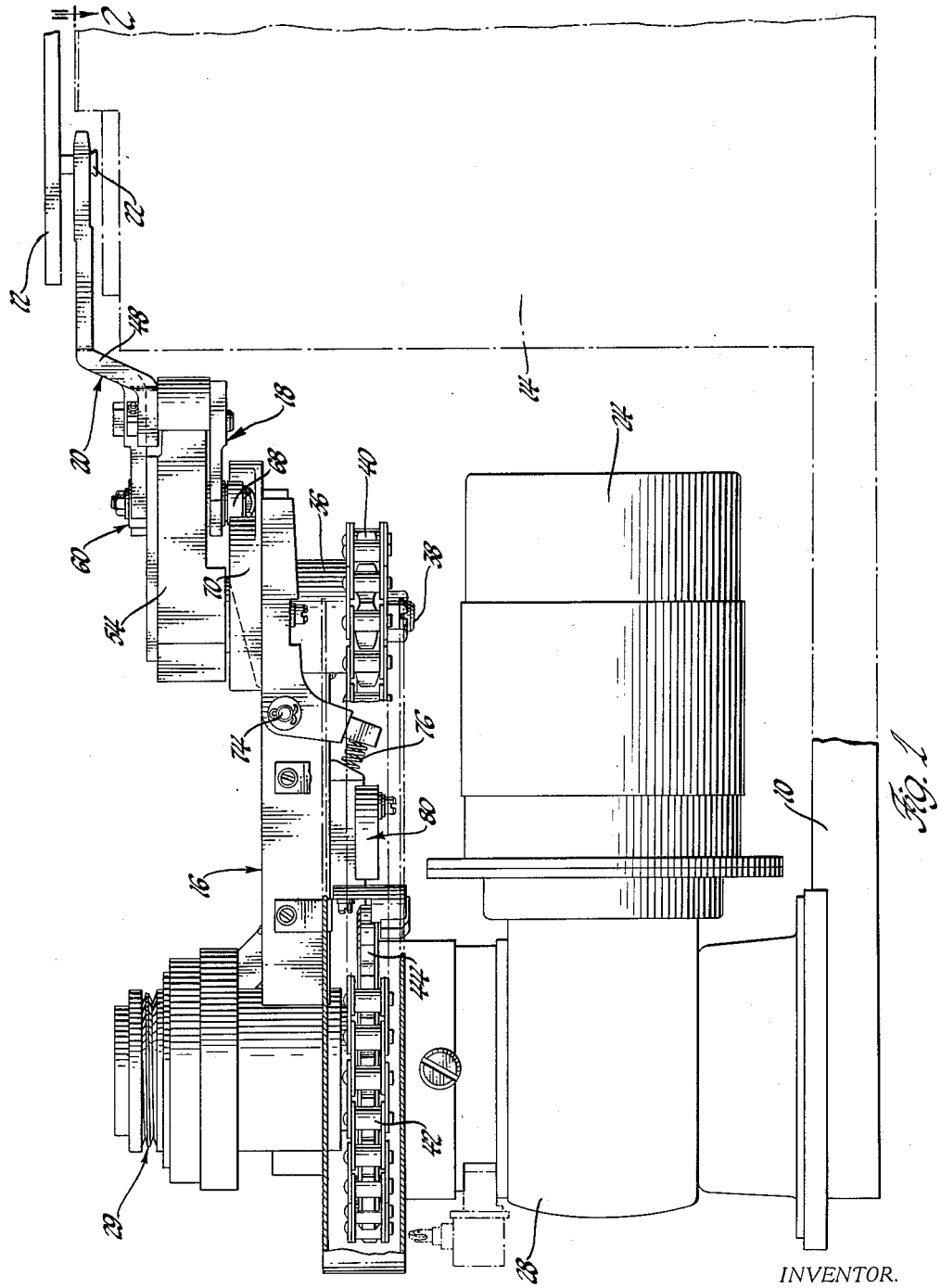
INVENTOR.
Leslie D. Richards
BY
W. J. Wagner
ATTORNEY

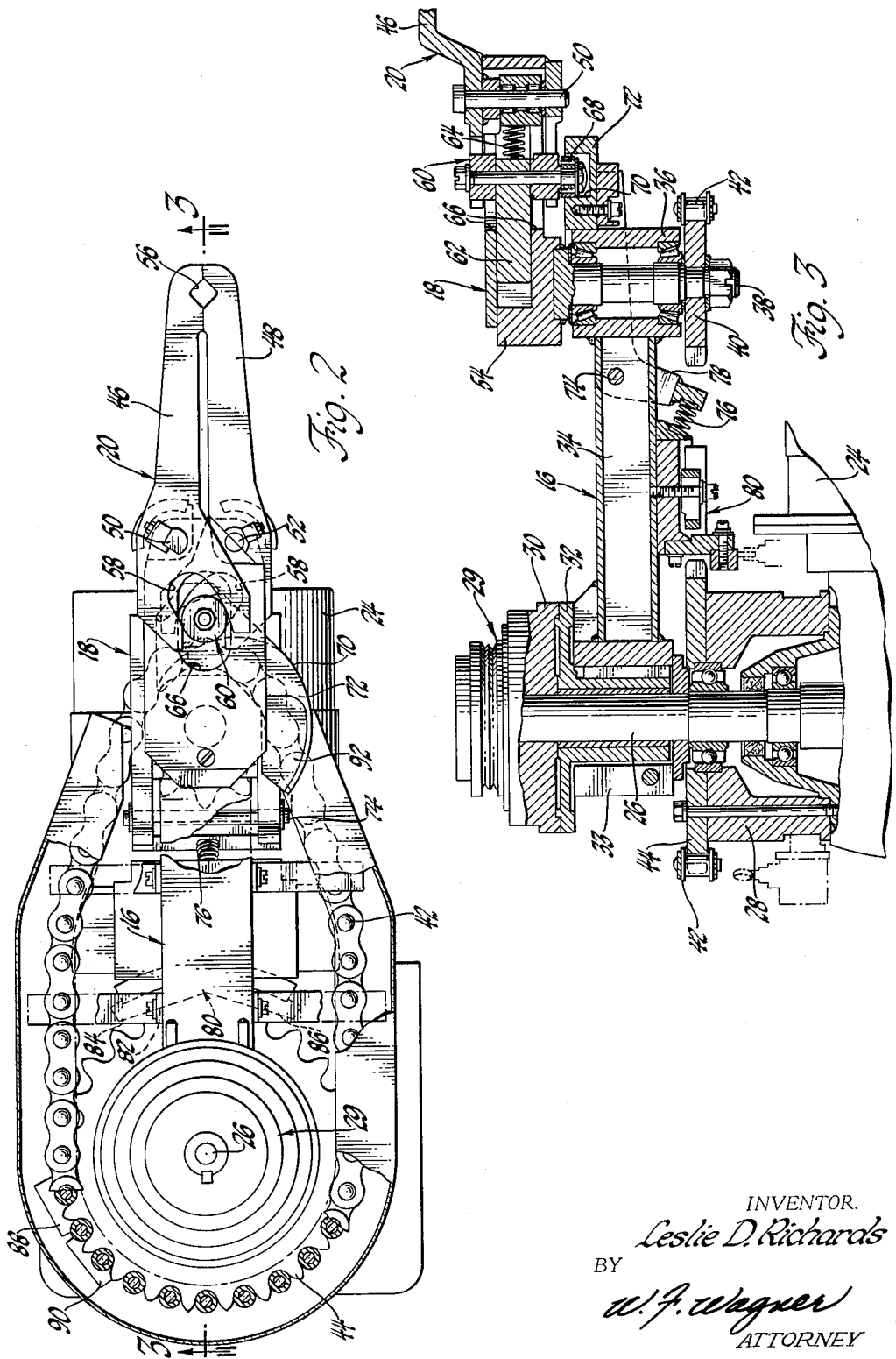

INVENTOR.
Leslie D. Richards
BY
W. F. Wagner
ATTORNEY

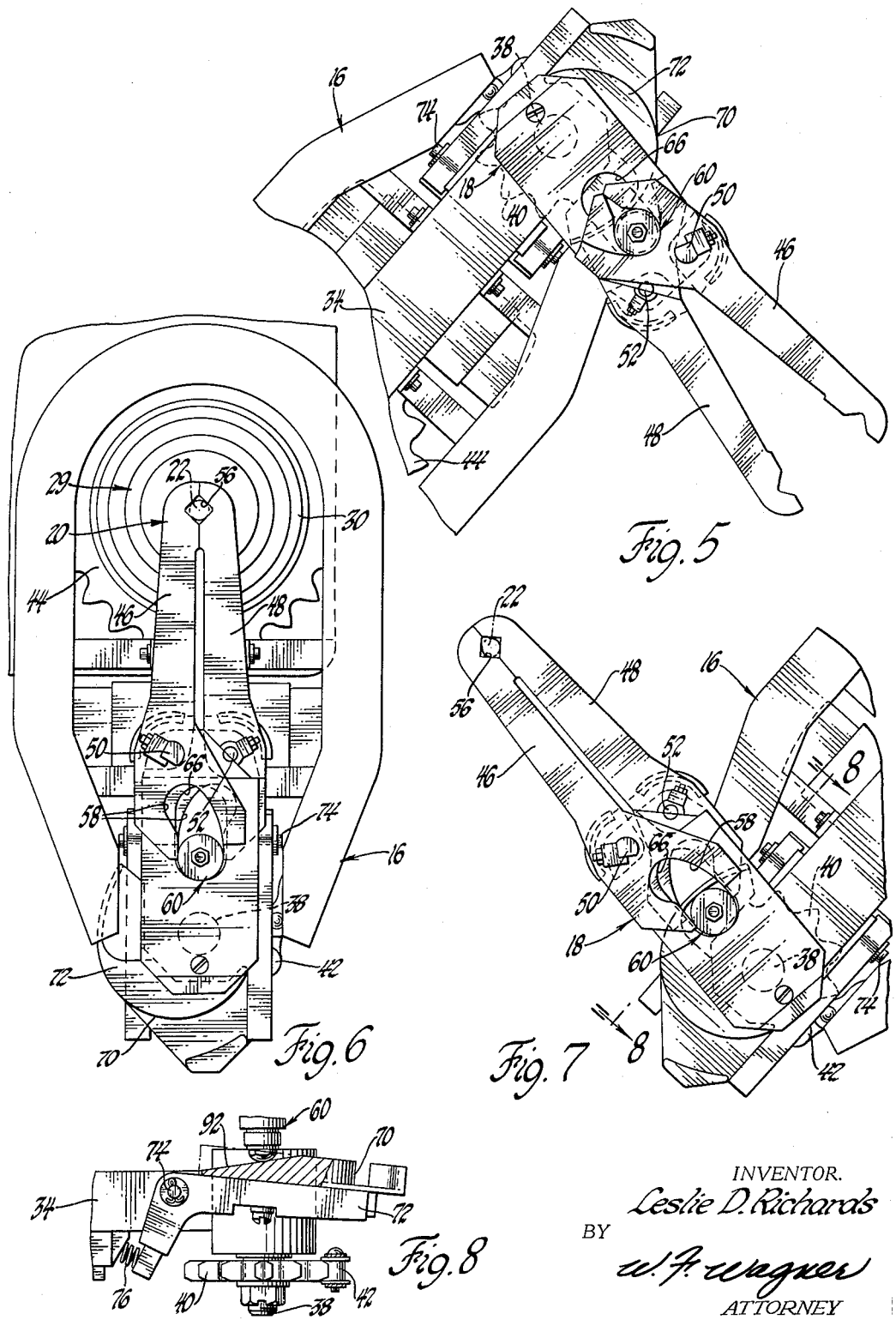

United States Patent Office 3,240,360
Patented Mar. 15, 1966

3,240,360
WORK PIECE TRANSFER DEVICE
Leslie D. Richards, Utica, Mich., assignor to General Motors Corporation, Detroit, Mich., a corporation of Delaware
Filed Mar. 2, 1964, Ser. No. 348,350
2 Claims. (Cl. 214—1)

This invention relates to a work piece transfer device which is specifically adapted for loading and unloading large heavy die trays into and out of presses such as those typically utilized in dielectric embossing processes.

The dielectric embossing presses presently used for forming automobile trim panels and the like can be best described as four poster press with an upper stationary platen and a lower movable platen. The dies used with these presses are generally mounted on movable shuttle trays that are loaded with the trim materials by operators on each side of the press. Each tray weighs several hundred pounds and is manually moved into and out of the press by the operator. Apart from the physical strain imposed upon the operator, this method of transferring a work piece from one point to another has been found to be unsatisfactory because of the difficulty often experienced in positively positioning the trays in the press. Hence, it should be apparent that if some form of mechanical mechanism could be utilized for shifting the trays into and out of the presses, dielectric embossing operations would be greatly facilitated.

Accordingly, the principal object of this invention is to provide a transfer mechanism for moving and positively locating heavy work pieces between a feed station and work station.

Another object of this invention is to provide a work piece handling device that converts rotary motion into rectilinear movement so that a work piece is moved between a feeding station and a work station along a straight line.

Stated broadly, the above and other objects are realized with a motor driven work piece transfer mechanism which in the preferred form has a primary carriage supported on a rigid base member for rotation about a fixed vertical axis. A secondary carriage is rotatably mounted on the primary carriage and includes a pair of work piece transfer jaws that are supported for pivotal movement and serve to hold the work piece. Means interconnect the secondary carriage with the base member so that upon rotary movement of the primary carriage the jaws reciprocate along a straight line which passes through the aforementioned fixed vertical axis. In addition, a camming arrangement is provided which opens and closes the jaws to respectively release and grasp the work piece during an operating cycle.

A more complete understanding of the invention can be derived from the following detailed description when taken in conjunction with the drawings in which:

FIGURE 1 is an elevation view of the work piece transfer apparatus made in accordance with the invention;

FIGURE 2 is a view taken on lines 2—2 of FIGURE 1;

FIGURE 3 is a fragmentary sectional view taken on lines 3—3 of FIGURE 2;

FIGURE 5 illustrates in detail the work piece transfer jaws and the positions assumed by the various components associated with the secondary carriage when the apparatus is in position B of FIGURE 4;

FIGURE 6 is a view similar to that of FIGURE 5 but shows the positions of the various components of the secondary carriage when the latter is in position E of FIGURE 4;

FIGURE 7 is a view showing the relative position of the various components of the secondary carriage when the latter is in position F of FIGURE 4;

FIGURE 8 is a view taken along lines 8—8 of FIGURE 7.

Figure 4:
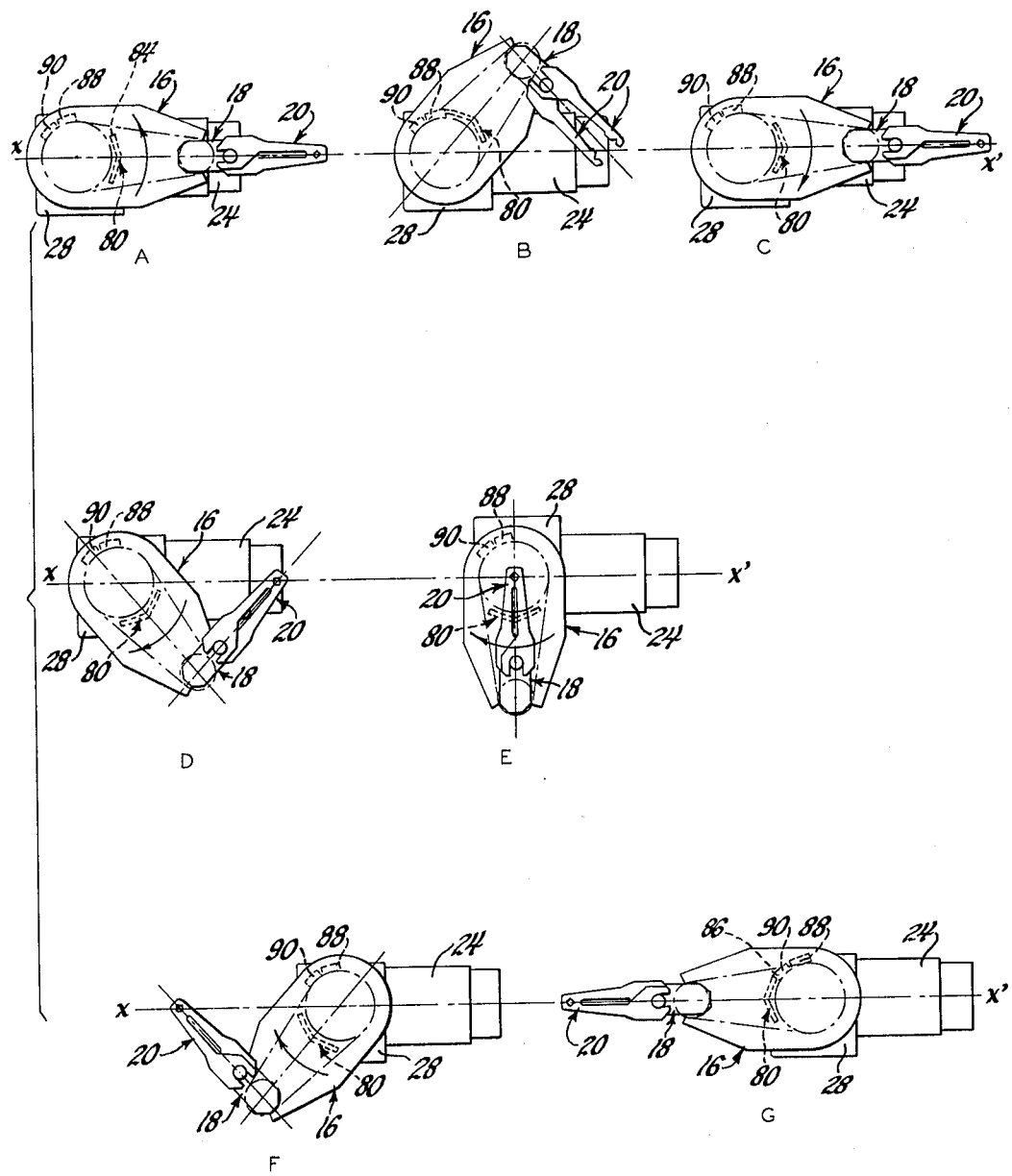
FIGURE 4 illustrates in sequential views the opening and closing of the work piece transfer jaws and the rectilinear movement thereof during a portion of an operating cycle.

Referring now to the drawings and more specifically to FIGURES 1, 2, and 3 thereof, the work piece transfer device made in accordance with the invention is shown rigidly mounted on a base plate 10 and in a fully extended position for grasping a die tray 12 located within the dielectric embossing press 14 preparatory to removing the tray from the work station. In general, the device comprises primary and secondary carriages 16 and 18 the latter of which supports a jaw portion 20 that is adapted to clamp onto a lug 22 fixed to the die tray 12 and retract the latter from the work station or full line position shown in a manner to be described hereinafter.

A reversible electric motor 24 serves to drive the transfer device and is connected through suitable gearing (not shown) to an upright drive shaft 26 rotatably journaled in a base housing 28 that serves as the stanchion portion of the device. The upper portion of the drive shaft 26 is connected to the primary carriage 16 through a slip-clutch arrangement 29 which includes a driving member 30 and a driven member 32, the latter of which is rotatably positioned about the drive shaft and fixed with a hub 33 secured to one end of a radially extending arm 34 of the carriage 16. The other end of the arm 34 terminates with a cylindrical support 36 which rotatably supports a stub shaft 38, one end of which is fixed to a sprocket wheel 40 while the other fixedly supports the secondary carriage 18. A chain 42 is entrained about the sprocket wheel 40 and a sprocket wheel 44 which is fixed to the base housing 28. Both sprocket wheels are located in a common horizontal plane and the arrangement is such that as the primary carriage 16 rotates, the fact that the sprocket wheel 44 is rigid with the base housing 28 results in the sprocket wheel 40 rotating and causing a pivotal movement of the secondary carriage 18 about a vertical axis passing through the center of the stub shaft 38. Moreover, it should be noted that the sprocket wheel 44 has a diameter equal to twice that of the sprocket wheel 40 for reasons which will become more apparent as the description of the invention proceeds.

As aforementioned, the secondary carriage 18 supports a jaw portion 20 comprising a pair of work piece transfer jaws 46 and 48 pivotally connected by pins 50 and 52 to the body portion 54 of the carriage 18. As best seen in FIGURE 2, the forward or right-hand portion of each jaw is formed with an identical angle notch so when the jaws are closed as seen, a diamond shaped aperture 56 is formed for accommodating the lug 22 on the die tray 12. The opposite ends of the jaws are located in overlapping relationship and each is provided with a curved slot 58. For reasons to be explained, the slot 58 extends in an upper direction in jaw 46 while in jaw 48 the slot 58 extends downwardly as viewed in FIGURE 2. Adjacent the rear of the jaws and located within the slots 58 thereof, is a cam follower 60 bolted to a block 62 which in turn is biased to the left by a coil spring 64 and guided for reciprocal movement along the longitudinal axis of the secondary carriage 18 by aligned oblong slots 66 provided in the opposite faces of the body portion 54. The lower end of the cam follower 60 is provided with a roller 68 which, as seen in FIGURES 2 and 3, engages the curved surface 70 of a camming member 72. The camming member 72 is pivoted to the arm 34 of the carriage by a transverse pin 74 and is normally urged into an upward position by a coil spring 76 connected between the lower end 78 of the camming member 72 and a stop block 80 secured beneath the arm 34. As seen in FIGURE 2, the stop block 80 consists of an angled member 82 having the opposite ends 84 and 86 serving as contact portions adapted to respectively engage limit switches 88 and 90 suitably supported by the base housing 28. The respective limit switches serve to de-energize the electric motor 24 whenever they are engaged by the aforementioned contact portions.

In order to more fully understand the workings of this invention, reference is now made to FIGURE 4 which shows in sequence the positions assumed by the carriage and the jaw portion as the work piece transfer device moves through a portion of a cycle. In FIGURE 4, position A shows the device in the position of FIGURES 1, 2 and 3 in which the die tray 12 has just been inserted into the press.

In this position, the roller 68 of the cam follower 60 is located at a low point of the camming surface 70, and the electric motor 24 rotates the drive shaft 26 in a counterclockwise direction as viewed in FIGURE 2. This causes a rotary movement of the primary carriage 16 in the counterclockwise direction which results in the sprocket wheel 40 rotating in a clockwise direction about its axis as it moves under the guidance of the chain 42 to position B. As a result, the secondary carriage 18 pivots clockwise to the position B and causes the roller 68 to move along the riser portion of the camming surface 70 to force the upper end or wedging end of the cam follower 60 into the slots 58 of the jaws 46 and 48. Inasmuch as the slots 58 are curved as aforedescribed, the rear ends of the jaws pivot toward each other and cause the free ends of the jaws to move apart as shown in FIGURE 5. Thus, after the die tray 12 has been inserted into the press, the work piece transfer jaws release the tray and move to a position which places the jaws out of the area of the press interior. The device stops in position B due to the contact surface 84 of the stop block 80 encountering the limit switch 88 to de-energize the electric motor 24. Subsequently, the press closes and the dielectric embossing operation is performed upon completion of which the press is again opened and the die tray 12 is ready for removal from the press interior.

To remove the die tray 12, the electric motor 24 is again energized, however in this instance, in the opposite direction so that the drive shaft 26 rotates in a clockwise direction as viewed in FIGURE 2. This, of course, causes the primary carriage 16 and secondary carriage 18 to move from position B to position C which is identical to position A in which the jaws are again closed on the lug 22 of the die tray. In this instance, however, clockwise rotation of the drive shaft continues so that the device moves through positions D, E and F until the carriage 16 reaches a point diametrically opposite to that shown in position A. This final position is shown as position G where contact surface 86 engages the limit switch 90 to de-energize the electric motor 24 and stop the device. It should be noted that as the device moves through all of the positions to that at G, the jaws are closed on the lug 22 and the latter together with the die tray is moved along a straight line indicated by the axis XX'.

In position G of the operating cycle, the die tray 12 will be located in the fully retracted position or feeding station and readily accessible to the operator so that the latter is able to remove the embossed material and replace it with new material to be embossed. Thereafter the operator simply energizes the electric motor once again, in this instance to again reverse the direction of movement so that the carriage 16 moves in a counterclockwise direction starting from position G and moving through the other positions indicated, but this time in a reverse order up to position B where the cycle is completed.

It should be noted that as the device moves from position E to position F, the camming member 72 would normally interfere with the movement of the secondary carriage 18. In order to provide for this contingency, the rear of the upper surface of the camming member 72 is formed with a ramp 92 so that the lower end of the cam follower 60 can ride onto the ramp and accordingly pivot the camming member 72 about the pin 76 out of an interfering position as best seen in FIGURES 7 and 8. Furthermore, it should be noted that as seen in FIGURE 6, the above-described device is designed so that the distance between centers of the sprocket wheels 40 and 44 is equal to the distance between the centers of sprocket wheel 40 and the aperture 56 formed by the closed jaws. This relationship coupled with the 2 to 1 dimensioning of the sprocket wheels accounts for the rectilinear movement described earlier.

Various changes and modifications can be made in the abovedescribed mechanism without departing from the spirit of the invention. It should be understood that such changes and modifications are contemplated by the inventor and therefore he does not intend to be limited except by the scope of the appended claims.

I claim:
1. A work piece transfer device for moving a work piece along a rectilinear path, comprising a base member, a primary carriage supported on said base member for rotary movement about a first axis, a secondary carriage supported on said primary carriage for rotary movement about a second axis parallel to said first axis, a pair of coacting work piece transfer jaws pivotally mounted on said secondary carriage and being formed with work piece holding portions having the center thereof located a distance from said second axis equal to the distance between the first and second axes, means for rotating said primary carriage about said first axis, means interconnecting said base member with said secondary carriage whereby rotation of said primary carriage causes the secondary carriage to rotate so that the center of said work piece holding portions reciprocates along a straight line passing through said first axis, a cam follower, means on said secondary carriage supporting said cam follower for movement between a first and second position, a camming member supported by the primary carriage and cooperating with said cam follower for moving the latter between said positions during a portion of the rotative cycle of the primary carriage, overlapping slots formed in said jaws, and a portion of said cam follower located in said slots so that movement of the cam follower between the first and second positions causes the jaws to open and close respectively.

2. A work piece transfer apparatus for feeding and retracting a work piece in a rectilinear path to and from a work station, comprising a rigid base member, a first sprocket wheel fixed to said base member, a primary carriage mounted for rotary movement about an axis passing through the center of said first sprocket wheel, a second sprocket wheel located in a common plane with said first sprocket wheel and rotatably supported on said primary carriage at a point spaced from said axis, a secondary carriage rigidly connected to said second sprocket wheel for rotation therewith, a chain interconnecting said first and second sprocket wheels whereby rotation of said primary carriage in one direction causes the secondary carriage to rotate in the opposite direction, a pair of coacting work piece transfer jaws pivotally mounted on said secondary carriage and having work piece holding portions formed thereon, the center of said holding portions being located a distance from the center of said second sprocket wheel that is equal to the distance between the centers of the first and second sprocket wheels, a cam follower, means on said secondary carriage supporting said cam follower for movement between a first and second position, a camming member pivotally secured to the primary carriage and cooperating with said cam follower for moving the latter between said positions when said primary carriage is rotated, a curved slot formed in each of said transfer jaws, and a portion of said cam follower positioned in the slot of each of said transfer jaws so that movement of said cam follower between the first and second positions causes the jaws to open and close respectively.

References Cited by the Examiner

UNITED STATES PATENTS 1,740,575 12/1929 Clausen.
2,304,703 12/1942 O'Leary _____ 294—116 XR
2,711,817 6/1955 Hatau.
3,010,587 11/1961 Hollinger.

MARVIN A. CHAMPION, *Primary Examiner.*